Mar. 3, 1925.
A. S. PILLANS
EDUCATIONAL CARD GAME
Filed March 5, 1921
1,528,690
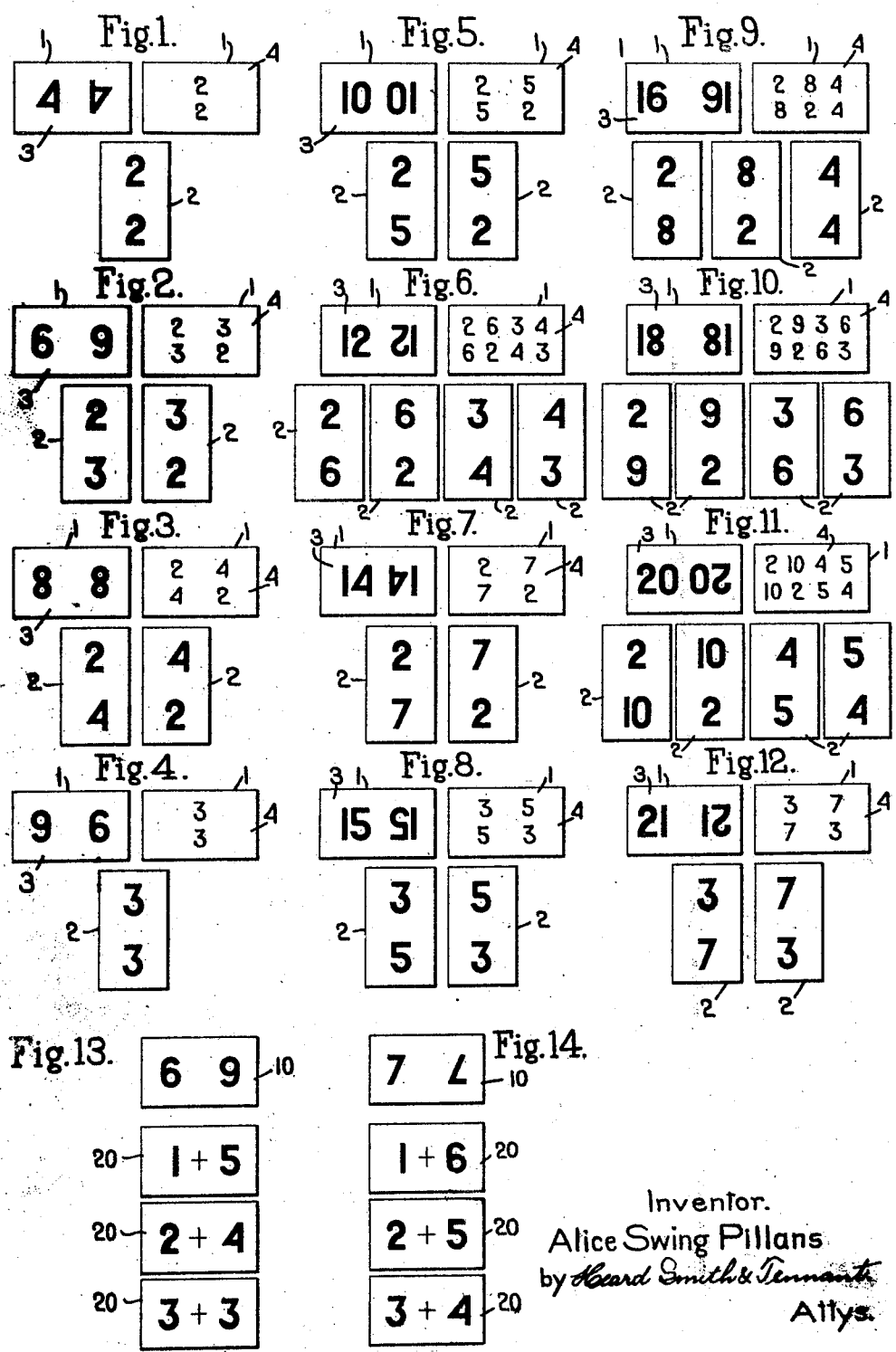
Inventor.
Alice Swing Pillans
by Heard Smith & Tennant
Attys.

Patented Mar. 3, 1925.

1,528,690

UNITED STATES PATENT OFFICE.

ALICE SWING PILLANS, OF BERKELEY, CALIFORNIA.

EDUCATIONAL CARD GAME.

Application filed March 5, 1921. Serial No. 449,988.

*To all whom it may concern:*

Be it known that I, ALICE SWING PILLANS, a citizen of the United States, resident of Berkeley, county of Alameda, State of California, have invented an Improvement in Educational Card Games, of which the following description, in connection with the accompanying drawing, is a specification, like characters on the drawing representing like parts.

This invention relates to educational card games, and has for its object to provide a novel game of this type which is especially intended for teaching arithmetic to young children. The game may be used for teaching either addition or subtraction or multiplication or division. The same principle is used in a game adapted for teaching addition and subtraction as in a game for teaching multiplication and division, but the numerals on the cards are different.

My improved game comprises a deck of cards divided into books, and each book comprises one card, which I will hereinafter refer to as a "key card," having thereon a number, and in addition other cards which I will refer to as "combination cards" and each of which has thereon two numbers bearing an arithmetical relation which is expressed by the number on the key card. For instance, if the game is constructed for the purpose of teaching addition, each combination card will have thereon two numbers the sum of which is the number on the key card of the corresponding book, and each book will contain not only the key card with its number, but a plurality of combination cards bearing all the combinations of two numbers whose sum equals that on the key card.

Similarly, if the card game is used for teaching multiplication, then the number on each key card will represent a product, and each combination card for each book will have thereon two numbers whose product equals the number on the key card for said book. The complete deck will comprise any desired number of books.

In order to give a better understanding of my invention, I have illustrated in the drawings some selected embodiments thereof which will now be described, after which the novel features will be pointed out in the appended claims.

Figs. 1 to 12 inclusive show different books of a set of cards adapted to teach multiplication;

Figs. 13 and 14 show two books of cards adapted to teach addition or subtraction.

As stated above, the complete set of cards is made up of a plurality of books, and each book comprises a key card and one or more combination cards. The key cards and combination cards are preferably of different colors, so that they can be readily distinguished from each other.

In Figs. 1 to 12 the key cards for each book are indicated by 1 and the combination cards by 2. In each figure I have shown both the front and the back of each key card 1. Referring to Fig. 5, for instance, the key card 1 has imprinted on the front face 3 thereof the numeral "10," and this is printed twice in such positions that the card can be read either side up. The rear face 4 of each key card may have thereon the different factors of the number appearing on the face 3 and I will preferably arrange these factors in pairs so that each pair contains two factors, which when multiplied together produce the product represented by the numeral on the face 3 of the card. For example, if the number appearing on the face of the card (which number I will refer to as the product number) is "10" as shown in Fig. 5, then the factors which appear on the back of the card will be "2" and "5" and these factors may be arranged in two groups or appear as follows: $\frac{2}{5}$ and $\frac{5}{2}$.

The number of combination cards in any book is determined by the number of pairs of factors which can be used in producing the product number on the face of the card. In the example just given, wherein the product number on the face of the card is 10, there are two pairs of factors, to wit, 2—5, 5—2 and therefore in a book in which the key card bears the product number "10" as shown in Fig. 5, there will be two combination cards 2, on one of which will be printed the numbers "2" and "5" with the "2" taking precedence over the "5", and on the other of which will be printed the numbers "5" and "2" arranged with the "5" taking precedence over the "2." The factor numbers on the combination cards may have any suitable arrangement. In the drawings they are shown as being printed one over the other, so that one combination card has the number "2" appearing over the number "5" and the other has the number "5" appearing over the number "2." These factor numbers may, however, be placed side by side similar to the arrangement shown in Fig. 13 so long as they are arranged in proper pairs with one number of each pair arranged to have precedence over the other number of the pair.

I may, if desired, place on the back of each combination card one of the factor numbers appearing on the face of the card and where this is done I will preferably place on the back of each combination card the particular number on the face of the card which takes precedence.

In Fig. 9 I have shown another book in which the key card 1 has on its front face the product number "16" and as "16" equals either 2×8 or 8×2 or 4×4, hence in a book in which the key card bears the number "16" there will be three combination cards 2, one bearing the factor numbers "2" and "8" arranged with the number "2" taking precedence, another bearing the factor numbers "8" and "2" with the number "8" taking precedence and the other bearing the two factor numbers "4".

In any book, therefore, there will be as many combination cards as there are combinations of factors, which when multiplied together produce the number on the key card.

In Fig. 1 where the key card bears the numeral "4" there will be only one combination card, that bearing the number "2" twice.

In Fig. 2 the key card 1 bears the number "6" and there will be two combination cards 2, one bearing the numerals "2", "3" and the other bearing the numerals "3", "2".

Fig. 3 shows a book in which the key card bears the product number "8". In this book there will also be two combination cards 2, one bearing the numerals "2", "4", and the other bearing the numerals "4", "2".

In Fig. 4 a book is shown in which the key card bears the product number "9", and this book will contain a single combination card 2 bearing the numerals "3", "3".

In Fig. 6 a book is shown in which the key card bears the numeral "12" and this book will contain four combination cards 2, one of which bears the numerals "2", "6", another of which bears the numerals "6", "2", another of which bears the numerals "3", "4", and the remaining one of which bears the numerals "4", "3".

In other figures of the drawings, I have shown books in which the key card bears the numerals, "14", "15", "18", "20" and "21," and each book will contain as many combination cards as there are combinations of factors, which when multiplied together produce the number on the key card.

The game can be played in various ways. One way would be to distribute the cards 1 among all the players, and then to take all the combination cards for said key cards and shuffle them, and then deal two, three, or five to each player as desired, the remaining combination cards being placed in a pile face down. Each player may then lay his combination cards on the table in front of him face up. Having thus dealt the cards, the first player will give quickly the products of the two factors on each of the combination cards which are face up before him, and the other players will watch to see if the correct answers are given. If the player gives the wrong answer, any of the other players may call attention to the fact, in which case the player giving the wrong answer will have to pay some prescribed penalty. After each player has thus given the products of the factors on each of his combination cards, then the first player lays one of his key cards in the center of the table, and the next player will lay below this product card any combination cards he may have which belong to the book including said key card. If the second player has been able to lay down any combination card, then he draws another combination card from the stack on the table and exposes it at once, at the same time stating quickly the product of the two factors. Said second player then lays down one of his key cards and the third player then places under it any combination cards he may have which belong to the book represented by the key card of the second player. The third player may then draw another combination card from the stack, and then the fourth player takes his turn and plays as above described. After continuous playing, the books will all be matched up.

The above is only one suggestion as to the manner in which this game might be played, and there are other ways of playing with these cards which will be equally instructive for the players. The playing of the game requires constant metal arithmetical calculations by the players, and in using this game they soon become thoroughly familiar with the multiplication tables.

The same cards may be used for teaching the children division by playing in the same way.

In Figs. 13 and 14, I have illustrated two books which are designed for teaching pupils addition. In these figures, the key cards are indicated at 10 and the combination cards at 20. Each key card will have thereon a number, and each combination card has thereon two numbers, the sum of which equals the number on the key card. Each book will therefore contain as many combination cards as there are combinations of two numbers which added together make the number on the key card. In Fig. 13 the key card bears the number "6," and the combination cards bear the legends "1 plus 5," "2 plus 4" and "3 plus 3."

In Fig. 14 the key card bears the number "7" and there are three combination cards bearing the lines respectively "1 plus 6," "2 plus 5" and "3 plus 4." As the numbers on the key card increase in value, there will, of course, be an increased number of combination cards in the book. The game having cards such as shown in Figs. 13 and 14 may be played as above described, except that the arithmetical calculations which are made by the players will be either addition or subtraction, rather than multiplication or division.

When the cards are printed for teaching addition and subtraction I do not regard it as necessary to place any numbers on the back of the key card. I may, however, place on the back of each combination card 20, one of the numbers appearing on the face of the card. These numbers which appear on the back of the card are useful in teaching subtraction, for when the number on the back of any combination card in a book is subtracted from the number on the key card of said book, the result will be the number on the face of said combination card which is not a duplicate of that on the back of the card.

The numbers on the back of the combination cards which are imprinted for teaching multiplication may also be used in teaching division, because when the product number on the key card of any book is divided by the number on the back of any combination card of said book, the quotient will be the number on the face of said combination card which is not a duplicate of that on the back of the card.

I claim.

1. An educational card game comprising a plurality of books of cards, each book being made up of a key card and one or more combination cards, each key card bearing on one face a number which is the product of two other numbers, and each of the combination cards having thereon two numbers which multiplied together produce the product number on the key card, there being as many combination cards as there are groups of two numbers each multiplied together to produce the product on the key card, said key card also having on the opposite face groups of two numbers each which are duplicates of the groups on the various combination cards.

2. An educational card game comprising a plurality of books of cards, each book being made up of a key card having a number thereon and as many combination cards as there are groups of two numbers each, with the numbers of each group bearing an arithmetical relation which is expressed by the number on the key card, each combination card having on one face thereof the numbers of one group only, each key card also having on its rear face groups of two numbers each which are duplicates of the groups on the combination cards.

In testimony whereof, I have signed my name to this specification.

ALICE SWING PILLANS.